Jan. 28, 1958 C. F. JENSEN 2,821,577

ELECTRICAL PHONOGRAPH TRANSDUCER WITH MULTIPLE STYLI

Filed Aug. 30, 1954

INVENTOR.
Clarence F. Jensen
BY
Mason, Kolehmainen, Rathburn + Wyss
Attys.

2,821,577

ELECTRICAL PHONOGRAPH TRANSDUCER WITH MULTIPLE STYLI

Clarence F. Jensen, Racine, Wis., assignor to Webster Electric Company, a corporation of Delaware Application August 30, 1954, Serial No. 453,061

3 Claims. (Cl. 179—100.41)

The present invention relates to electrical phonograph transducers and more particularly to improvements in multiple stylus phonograph pickups or cartridges.

In the past, various types of constructions have been utilized to provide transducers or phonograph pickups which would play both 78 R. P. M. records and microgroove records which rotate at speeds of 33⅓ or 45 R. P. M.

The present invention has for one of its primary objects the provision of a new and improved pickup cartridge which can be constructed readily and economically and which can be readily conditioned selectively to render effective one or the other of a plurality of styli.

A further object of the present invention is the provision of a new and improved multiple stylus phonograph pickup cartridge including a transducer assembly having a stylus coupling member projecting therefrom and including a rotatable knob and dual stylus assembly associated with the coupling member and adapted to be mounted as upon a bracket fastened to the transducer housing and wherein the knob and stylus assembly is rotatable into selected positions to bring one or the other of the styli into operative position and, furthermore, wherein a knob assembly has associated with it a novel indexing mechanism properly to position the selected stylus in its operative position.

In brief, the transducer of the present invention includes a transducer element having coupled thereto a chuck adapted to receive a stylus coupling member or guide having a projecting apertured portion. A mounting bracket is secured to the transducer housing. Upon the bracket is rotatably mounted a knob and stylus assembly. The latter includes a knob and a dual stylus. The knob is provided with a pair of longitudinally spaced apart bearing portions in trunnions formed on the bracket. It is also provided with a longitudinally extending aperture adapted to receive the shank of a double pointed stylus. The shank projects through the opening in the stylus guide through which the styli are operatively coupled to the chuck and transducer element. Between the longitudinally spaced bearings on the knob is located indexing means comprising a pair of diametrically oppositely spaced flats formed on the knob. The indexing means includes also a sort of a cradle like element or index bracket engaging the intermediate flat defining portion of the knob. The cradle like element is biased against the flats by a spring in such manner that the knob can be rotated as desired and held in selected position by engagement of the cradle or index bracket against the flats on the knob.

Other objects and advantages of the present invention will become apparent from the ensuing description of an illustrative embodiment of the invention, in the course of which reference is had to the accompanying drawing, in which.

Figures 1, 2, 3, 4, 5:
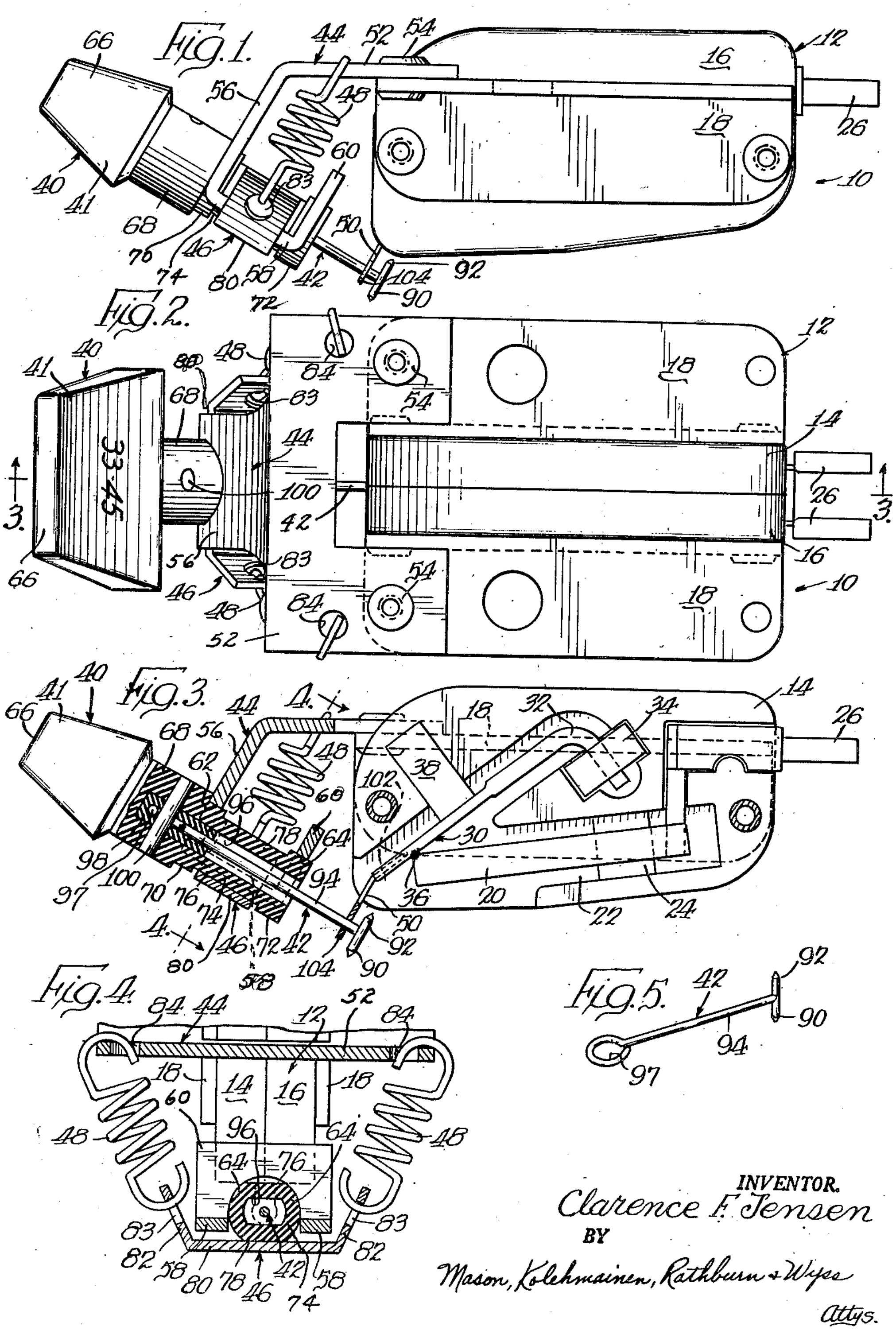
Fig. 1 is an enlarged side elevational view of a multiple stylus transducer constructed in accordance with the present invention.
Fig. 2 is a top plan view of the transducer.
Fig. 3 is a longitudinal cross sectional view taken along the line 3—3 of Fig. 2.
Fig. 4 is a transverse cross sectional view taken along the line 4—4 of Fig. 3.
Fig. 5 is a perspective view of the stylus.

Referring now to the drawing, it will be noted that the transducer phonograph pickup cartridge of the present invention is indicated as a whole by the reference character 10. It comprises a housing made of suitable insulating material, the housing being indicated as a whole by reference character 12 and including opposed like housing sections indicated by the reference characters 14 and 16. Suitable means illustrated as including generally right angle brackets 18 secured to the sides of the housing sections 14 and 16 are provided for supporting the cartridge in place in a suitable tone arm or the like.

The particular construction of the transducer element is of no great moment as far as the present invention is concerned. However, as illustrated, the transducer element 20, see Fig. 3, is shown as being of the ceramic type and mounted in a slightly downwardly inclined position in a recess 22 formed by the two housing sections 14 and 16. The rear end of the element is clamped between opposed mounting blocks of resilient material 24, only one of which is shown in Fig. 3. The transducer element is connected by conductors to the conventional terminals 26 through which the output of the element is coupled to conventional amplifying means.

The free end of the transducer element is connected to a chuck indicated as a whole by reference character 30 having a right angled upper end portion 32 mounted in an apertured block 34 of resilient material also held in place between the two housing sections 14 and 16. The lower end of the chuck is secured as by means of cement 36 or other suitable securing means to the free end of the transducer element 20. A block 38 of damping material may also be disposed between the two housing sections so as to bear on the upper side of the chuck 30. For further details regarding the construction of the transducer, reference may be had to my copending application Serial No. 278,442, filed March 25, 1952, and assigned to the assignee of this application.

In accordance with the present invention, there is rotatably secured to the transducer a knob-stylus assembly comprising a knob indicated as a whole by the reference character 40 and a stylus indicated as a whole by the reference character 42. This assembly is rotatably mounted upon a supporting bracket 44 secured to one end of the transducer housing as through the mounting brackets 18. The bracket 44 also supports an indexing bracket 46 biased against the knob by the pair of springs 48. Th estylus 42 is coupled to the transducer 20 through the chuck 30 and a stylus guide or coupling member 50 mounted, preferably detachably, in the chuck 30.

The stylus-knob assembly is supported upon the bracket 44. The bracket includes an upper horizontal portion 52 having a bifurcated end portion secured by the rivets 54 to the oppositely disposed transducer mounting brackets 18. The bracket includes also a downwardly and forwardly inclined portion 56, and downwardly and rearwardly inclined portion including the spaced apart extensions 58 (see Fig. 4) from which extends an upwardly and rearwardly extending portion 60 generally parallel to the portion 56. The knob-stylus assembly is rotatably secured in the lower part of the bracket which is essentially U-shaped and more particularly in the spaced apart downwardly opening generally semi-circular bearings 62 and 64 (see Fig. 3) in the portions 56 and 60, respectively.

The knob 40 includes a readily grasped terminal portion 66 which may carry indicia indicating the effective stylus as illustrated in Fig. 2 showing the microgroove stylus as being effective. It also includes a hub portion 68 abutting against the front of the bracket portion 56 and a pair of longitudinally spaced cylindrical portions or trunnions 70 and 72 received in the bearings 62 and 64. The knob includes also an intermediate portion 74 located between the trunnions and having diametrically opposed flats 76 and 78 (see Fig. 4).

The indexing means includes, as indicated heretofore, the spring biased indexing bracket 46. The bracket is generally U-shaped having a bight 80 intermediate the upwardly and divergently extending legs 82. The bight portion 80 bears against one or the other of the flats and is forced upwardly against the flats by the springs 48 which have their lower ends secured in apertures 83 in the legs 82 and their upper ends secured in apertures 84 at the sides of the bracket 44.

The stylus 42 includes a pair of stylus points 90 and 92 secured at right angles to the end of an elongated shank 94. The shank is mounted in the knob 41, the latter being provided with an axial opening 96 of generally rectangular shape (see Fig. 4). The shank terminates in a loop or eye 97 at its end and this end is mounted in the opening 96 by a strip 98 of resilient material encircling the loop and a short portion of the shank (see Fig. 3). Accordingly, the shank and stylus are mounted in cantilever fashion in the knob. The stylus is anchored to the knob so that it cannot be accidentally pulled out from it by an anchoring pin 100 extending through the knob, the resilient mounting strip 98 and the eye 97 of the stylus.

The stylus is operatively coupled to the chuck 30 and thus to the stylus 42 by the stylus guide or coupling member 50. The latter has an end 102 detachably insertable into the free end of the chuck and an apertured portion 104 encircling the shank immediately to the rear of the stylus points 90 and 92.

From the foregoing detailed description of the present invention, it is apparent that the transducer can be constructed readily and economically and can also be easily and effectively adjusted for playing conventional or microgroove types of records. The adjustment can be readily effected by turning of the knob and it is certain because the knob is held in its selected position by the index bracket 46 which engages one or the other of the flats 76 or 78. The knob-stylus assembly is also held in place in the bearings 62 and 64 by the index bracket and the cooperating spring 48, the index bracket having a width slightly less than the trunnions 70 and 72 and the location of the spring being such as to maintain the parts in their assembled positions.

While the present invention has been described in connection with details of a particular embodiment thereof, it should be understood that these details are not intended to be limitative of the invention except insofar as set forth in the accompanying claims.

Having thus described my invention, what I desire to secure by United States Letters Patent is:

1. A phonograph transducer including a housing, a transducer element mounted in said housing, a stylus receiving chuck mounted in said housing and having an axially open end, a supporting bracket secured to and extending from said housing to one side of the chuck, said bracket having a pair of spaced apart bearings, a knob having a pair of spaced apart trunnions rotatably mounted in said bearings, said knob having a pair of index means providing flat surfaces in the space between the trunnions, an index bracket having a flat surface engaging said knob in the region of said flats, a pair of springs at opposite ends of the index bracket secured to the supporting bracket and biasing the index bracket toward the flats on the knob and holding the knob assembled relative to the bracket, said knob also having an axially extending opening, a stylus including a shank mounted in said axially extending opening, the shank having an eye at its end within said opening, a resilient mounting strip encircling at least said eye for mounting the shank in said knob, an anchoring pin extending through the knob, resilient mounting strip and eye, a pair of stylus points mounted at the end of said shank outside of the knob, and stylus guide member encircling the shank adjacent said stylus points and having an end detachably received in said chuck to couple the stylus to the transducer.

2. A phonograph transducer, including in combination, a housing, a transducer element mounted in said housing, a stylus receiving chuck mounted in said housing and having an axially open end, a stylus assembly mounted on said housing and including a rotatable stylus supporting shank, and means including a coupling member detachably mounted in the open end of said chuck and including a hole through which said shank extends and in which it is rotatable.

3. The transducer set forth in claim 2 in which the stylus supporting shank includes an apertured end portion disposed within an axially apertured rotatable knob, in which a resilient element encircles the apertured end portion, and in which a securing element extends through said knob, said resilient element, and said apertured end portion to provide a unitary stylus assembly.

References Cited in the file of this patent

UNITED STATES PATENTS

| | | |
|---|---|---|
| 2,567,105 | Dreisbach | Sept. 4, 1951 |
| 2,699,470 | Koren | Jan. 11, 1955 |
| 2,702,317 | Palo et al. | Feb. 15, 1955 |